Figure 1:
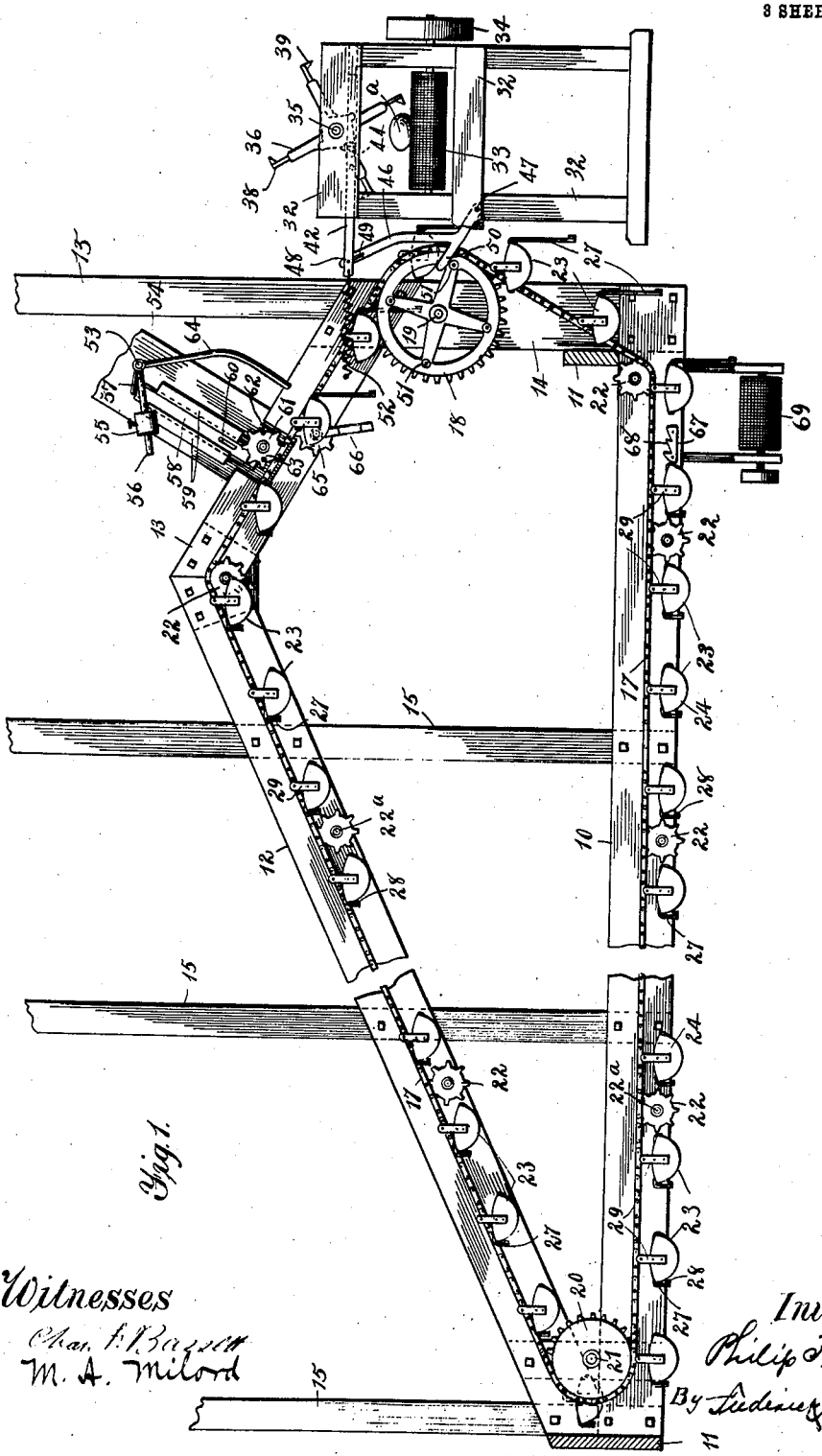

P. F. CARROLL.
DOUGH PROOFING APPARATUS.
APPLICATION FILED NOV. 21, 1910.

1,064,194.

Patented June 10, 1913.
3 SHEETS—SHEET 1.

Witnesses
Chas. F. Bassett
M. A. Milord

Inventor
Philip F. Carroll
By Ludeau & Benjamin
Atty.

P. F. CARROLL.
DOUGH PROOFING APPARATUS.
APPLICATION FILED NOV. 21, 1910.
1,064,194.
Patented June 10, 1913.
3 SHEETS—SHEET 2.
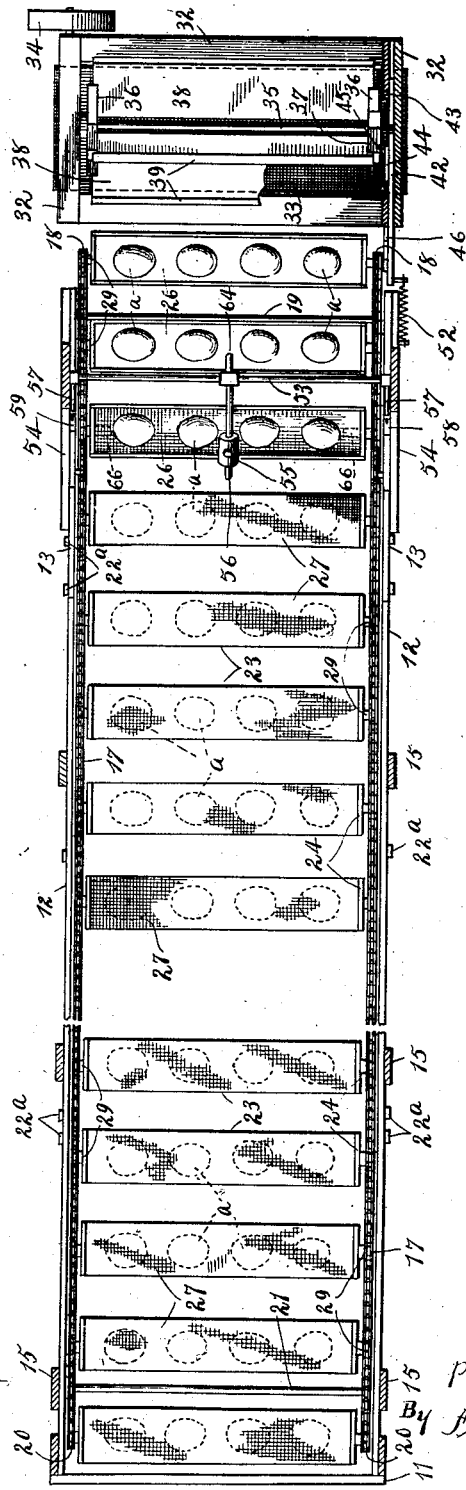

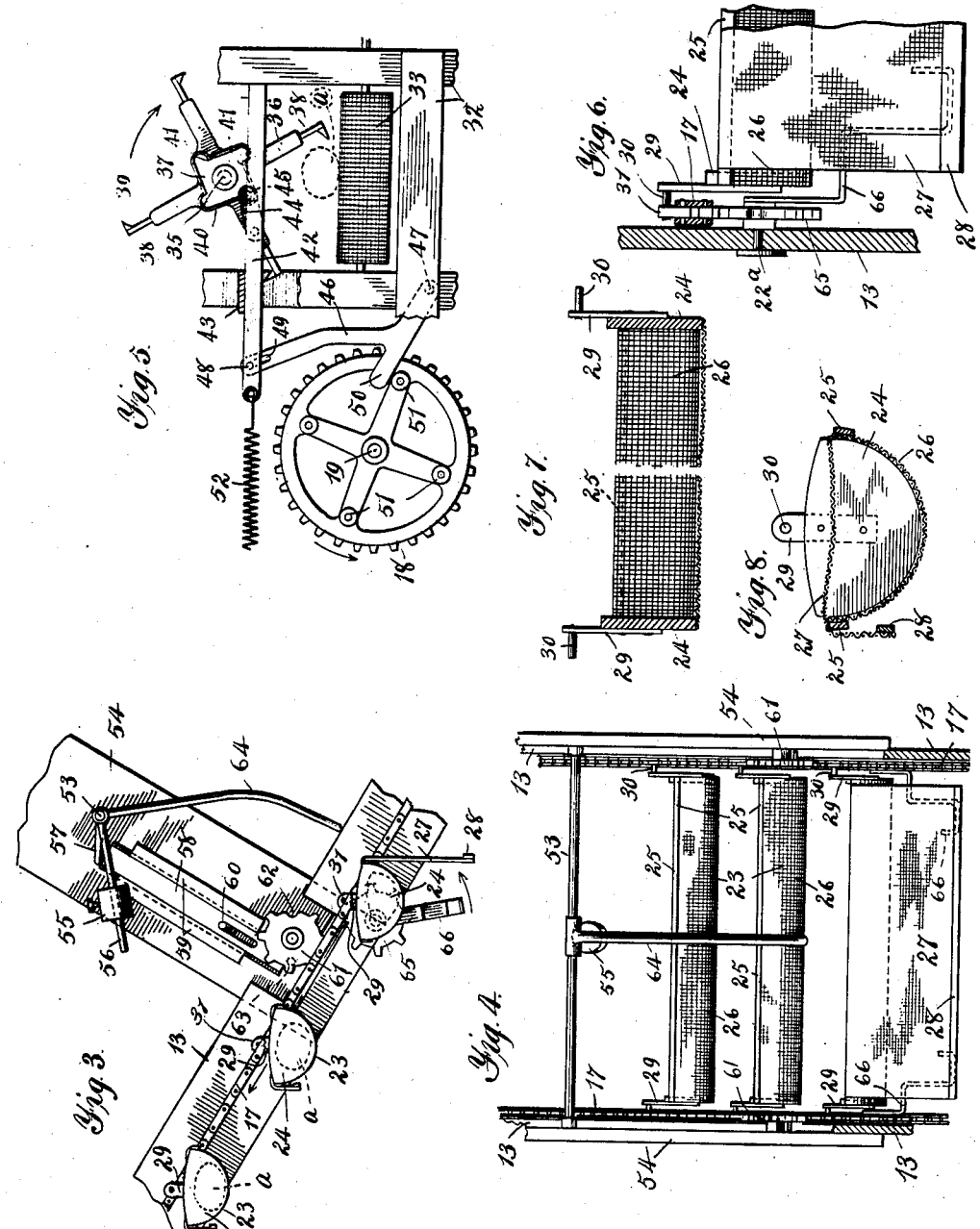

UNITED STATES PATENT OFFICE.

PHILIP F. CARROLL, OF JOLIET, ILLINOIS, ASSIGNOR TO CHAMPION MACHINERY COMPANY, OF JOLIET, ILLINOIS, A CORPORATION OF ILLINOIS.

DOUGH-PROOFING APPARATUS.

1,064,194.

Specification of Letters Patent.     Patented June 10, 1913.

Application filed November 21, 1910. Serial No. 593,303.

*To all whom it may concern:*

Be it known that I, PHILIP F. CARROLL, a citizen of the United States, residing at Joliet, in the county of Will and State of Illinois, have invented certain new and useful Improvements in Dough-Proofing Apparatus, of which the following is a specification.

My invention relates to bakers' machinery and refers especially to apparatus employed in that part of the process of preparing bread dough for the oven technically known as proofing.

The chief objects of the improvements which constitute the subject matter of this application for patent are:—to provide means whereby the divided portions of dough are maintained in a quiescent state, within covered receptacles, for a predetermined period of time previous to being molded into loaf form in suitable machines to which the pieces of dough are delivered from the proofing apparatus, and to arrange the apparatus so that there will be no interference with the rapid and continuous process of preparing the dough for baking without having it touched by human hands, and to furnish a mechanical system that can be readily expanded to meet the requirements of large baking plants.

The desired objects are secured by the employment of an apparatus in the form of a conveyer comprising a series of troughs or buckets pivotally hung at their ends to sprocket chains which pass over suitable sprockets, said buckets being adapted to hold several divided portions of dough, and furnished with flexible covers which, when in operative position convert the buckets into closed or dust-proof receptacles; means for loading the buckets with the required number of dough portions; means for automatically covering the buckets, means for dumping their contents, and means for operating the conveyer.

The manner of constructing an apparatus embodying my improvements is disclosed in the accompanying drawings which form a part of this application the important details and method of assembling being shown in the following views:—

Figure 1 is a side elevation of the apparatus, the front side of the frame, together with a portion of the attached sprocket chain being removed; Fig. 2 is a top plan view of the complete apparatus; Fig. 3 is a fragmentary view, enlarged, showing the mechanism for automatically covering the buckets; Fig. 4 is a partial view showing the cover operating devices in rear elevation; Fig. 5 is an enlarged fragmentary view illustrating the mechanism for operating the loading reel; Fig. 6 is a detail showing the manner of operating one of the cover lifting arms; Fig. 7 is a longitudinal section of one of the receptacles, and Fig. 8 is a transverse section of a receptacle with the cover in closed position.

Referring to the details of construction, the numeral 10 indicates horizontal framing members connected at their ends by cross pieces 11 to form a rectangular frame which is built of suitable timbers and may be of any length or width suited to the requirements. Extending rearwardly and upwardly from the front of this frame are inclined rafters or supports 12 which meet the ends of shorter rafters 13, inclined downwardly to the rear, and connected with the end of the horizontal frame by uprights 14. The horizontal and inclined members thus rigidly connected to form a solid framework which is preferably suspended from the ceiling of the work room in which it is installed, by means of hangers 15, thus giving headroom for the workmen and available floor space below the frame.

Running along the inner faces of the side members of the frame are sprocket chains 17, one upon each side, forming an endless conveyer. These chains pass around driving sprockets 18, carried by a shaft 19, journaled at the ends in the frame uprights 14, and are supported at the front of the machine by idler sprockets 20, having their shaft 21 supported in the sides of the frame. Other idle sprockets 22 mounted on stud shafts 22ᵃ are arranged at suitable intervals to properly support the chains and permit them to change direction of travel as desired. Extending transversely between the chains 17, are a series of uniformly spaced buckets 23 which are designed to receive the divided portions of dough that are to undergo the proofing process. As it is desirable to have a comparatively large number of these buckets placed as closely together in the conveyer as is practicable, it is necessary to build them of light weight and for this reason canvas enters largely into their construction. The frame of each bucket consists of semi-circular end pieces 24, made of light wood, connected by bars or strips 25 of the same material. Upon this skeleton framework is stretched a sheet of canvas 26, producing a semi-cylindrical trough or receptacle. This canvas is of considerably greater width than will suffice for the bottom, and the redundant portion constitutes a flap 27 which may be allowed to hang vertically from the edge of the receptacle or may be thrown across the upper open side to form a cover therefor, as shown in Figs. 1 and 8, the free margin of the flap or cover being weighted and at the same time stiffened by a lath or rigid strip 28 fastened along the edge. The buckets or receptacles are suspended by hangers consisting of metal straps 29 attached to the end pieces 24 and provided at their upper ends with pins 30 which are pivotally connected with ears 31 (Fig. 6) formed on special links, connected in the chains at suitable intervals.

For the purpose of depositing the dough portions in the buckets or receptacles, I provide a feeding device comprising a rectangular frame 32, arranged in proximity to the conveyer as it passes over the driving sprockets at one end of the apparatus. This frame supports an endless belt or apron 33, which runs transversely to the main conveyer, so that its margin is parallel with and close to the buckets as they move upward in their travel. This apron is driven by a pulley 34, and the dough portions, after being properly molded, are placed thereon at spaced intervals by mechanism not shown. Above this apron is arranged a loading reel or kicker comprising a shaft 35, journaled at the ends in the frame 32, and having mounted thereon reel arms 36, attached to hub plates 37, and arranged 90 degrees apart. Extending between opposite arms are connecting plates 38, having their outer margins armed with angular flanges or scrapers 39, arranged so as to project forward in the direction of rotation of the reel. The arms of the reel are of such length that the said flanges 39 will sweep close to the surface of the endless apron 33 when the reel is rotated, and thus come in contact with the dough portions which have been deposited upon said belt, and sweep them laterally from the belt, so that they will fall directly into one of the buckets which is in position to receive them. It is necessary to give the reel an intermittent motion, to permit the required number of dough portions to be brought to the proper position so that a predetermined number of dough portions will be swept simultaneously from the belt or apron 33 into the bucket which has arrived at the receiving point. To accomplish this automatically, one hub plate 37 of the reel has a rectangular face surrounded by a marginal flange 40, recessed at the corners to form angular projections 41 (Fig. 5) which serve as ratchet teeth. An operating bar 42, sliding in guides 43, carries a pawl 44, provided with a pin 45, which is adapted to engage the said ratchet teeth 41, when the said bar 42 is extended. This bar is operated in one direction by means of a bent lever 46, fulcrumed at 47 to the frame 32 and having its upper end pivoted to the said bar at 48; a slot 49 giving the needed play for the pivot pin. The said lever has a branch arm 50 which projects into the path of a series of rollers 51, mounted on the outer side of the sprocket wheel 18. The said bar 42 is held in retracted position by a spring 52, which has sufficient contractile power to operate the loading reel by the engagement of the pawl 44, with one of the teeth 41, which takes place when the bar 42 is extended by the action of the lever 46. As the empty receptacles move upward at the rear of the machine, they will be open, with their covers hanging vertically, as shown in Fig. 1, and after being filled, the next step will be to cover them which is done by coöperating mechanism arranged as near the feeding point as may be convenient. Extending transversely to the conveyer above the upper course is a rock-shaft 53 (Fig. 3) journaled at the ends in frame extensions or brackets 54 secured to the frame work 13. A weight 55, adjustable on an arm 56, attached to the middle of the shaft 53, holds the latter in initial position. At each end of the shaft are secured arms 57, each resting upon the upper end of a slide member 58, working in guides 59 on the brackets and limited in its movement by a pin 60. These slides are operated by sprockets 61, which engage the upper sides of the conveyer chains 17 each sprocket having one tooth cut away, as indicated at 62, to accommodate the ears 31 from which the buckets are suspended. Projecting outwardly from each of said sprockets 61 is a pin 63 which is adapted to engage the lower end of the slide 58, and lift the latter as the sprocket turns. Extending downwardly from the middle of the rock-shaft 53 is a lifting finger or arm 64, the lower end of which is adapted to swing just above the receptacles as they pass. Arranged below the sprocket chains at this point are sprocket wheels 65, which carry arms 66, bent laterally, as shown in Figs. 4 and 6, so that their ends will swing beneath the receptacles as they pass, and as the extremities of the arms have a more rapid motion than the chain the result will be that as the arms sweep beneath each receptacle they will lift the hanging cover flap to a position where it will be within the path of the finger 64, which is swung at the proper moment by the action of the pin 63, and having a more rapid motion than the arms 66, it will engage the cover flap in the middle and throw it over the receptacle closing the latter, after which it is immediately rocked back to its initial position through the action of the weight 55.

At a convenient point near the rear of the machine is placed a dumping or unloading device, consisting of blocks 67, arranged one upon each side of the frame. These blocks project into the path of the receptacles or buckets on their lower course so that they will engage the end pieces 24, arresting the direct movement of the receptacle, while the points of attachment to the chains will continue onward, causing the bucket to turn on its pivotal points and become gradually inverted, and dragging it in this position over the said blocks which are provided with teeth 68 to cause an agitation of the bucket that will insure the deposit of the contents upon an endless apron 69 placed transversely below the conveyer at this point. As soon as the buckets leave the blocks 67, they will be righted by the action of gravity, and are then in a position to receive a fresh load of dough pieces as they pass on, having been uncovered by the dumping procedure.

The functions of the various mechanisms having been explained in connection with their detailed descriptions, a general description of the operation of the machine will be sufficient to give a clear understanding of the apparatus as a whole. The divided portions of dough are deposited either mechanically or manually at suitable intervals upon the endless apron 38 as it travels, and the driving mechanism of the latter is so timed as to move a distance equal to the length of a pocket while the conveyer is moving the distance between the buckets, thus bringing the required number of dough loaves in front of one of the reel plates at the time the reel is operated. When one of the rollers 51 engages the arm 50 it will cause the bar 42 to move backward until the pin of the pawl 44 rides over a tooth 41. At this time the roller 51 will release the arm 50 and permit the bar 42 to fly back to its initial position under the action of the spring, 52, turning the reel one step and sweeping the dough portions on said apron into the rising bucket which has been brought into proper relation thereto by the general movement of the conveyer. Each bucket thus filled passes along to the covering point where the hanging flap 27 is picked up by the coöperating arms and fingers, 64, 66, and thrown over the top of the bucket in the manner previously described thus converting it into a closed receptacle. The dough portions thus closely covered remain undisturbed until the buckets in the course of their travel arrive at the dumping point where they engage the blocks 67, and are inverted as hereinbefore described so that the dough pieces will fall upon the conveyer apron 69.

Various changes in the details of construction may be required to suit the circumstances that may arise. Thus the conveyer may be made to assume any line of direction after it leaves the loading and covering points, and the number of receptacles may be varied as required, it being understood that the relation of the speed of the conveyer to the number of buckets contained therein, must be such as to cause a sufficient period of time to elapse while each bucket travels between the loading and unloading points to complete the proofing of the dough.

Having thus described my invention, what I claim as new, is:—

1. In a dough-proofing apparatus, a conveyer comprising a plurality of receptacles having flexible fabric sides and bottom and flexible fabric covers hinged thereon, means for delivering portions of dough to said receptacles, means for closing said covers, means for removing said covers, and means for inverting said receptacles to discharge the contents thereof.

2. In an apparatus for the purpose specified, the combination with a frame, a conveyer mounted on said frame and comprising a pair of sprocket chains and sprockets supporting said chains, of a series of receptacles extending between said chains and pivotally suspended therefrom, flexible covers for said receptacles, a dough feeding device, means for intermittently operating said device synchronously with the conveyer movement, means for covering the receptacles, said covering means comprising a pair of oppositely arranged sprockets engaging the conveyer chains, arms on said sprockets adapted to lift the covers, a rockshaft arranged above said sprockets, a finger on said shaft adapted to engage a cover when lifted by said arms, means for operating said rock-shaft, and means for emptying the receptacles.

3. In an apparatus for the purpose specified, the combination with a frame, a conveyer mounted on said frame and comprising a series of receptacles pivotally suspended therefrom, flexible covers for the receptacles, means for depositing portions of dough in said receptacles as they pass a given point, means for covering the receptacles when loaded, and means for inverting said receptacles, said inverting means comprising detents secured to the frame in the path of said receptacles.

4. In an apparatus for the purpose specified, a receptacle for the portions of dough comprising a frame, a fabric stretched over said frame and secured thereto, and a closure for the receptacle consisting of a flap of said fabric attached to one side of the receptacle and adapted to form a cover therefor.

5. In an apparatus for the purpose specified, the combination with a frame, of a conveyer mounted on said frame and comprising a pair of sprocket chains, sprockets supporting said chains, and a series of receptacles extending between said chains, each receptacle comprising a frame formed of end pieces, bars connecting the end pieces, a canvas covering for the frame, a cover consisting of a canvas flap attached by one margin to said frame, and hangers secured to the end pieces and adapted to be pivotally attached to said chains.

6. In an apparatus for the purpose specified, the combination with a frame, a conveyer mounted on said frame and comprising a pair of sprocket chains, and sprockets supporting said chains, of a series of receptacles extending between said chains and pivotally suspended therefrom, and means for depositing dough portions in each receptacle, said means comprising a frame, an endless apron mounted on said frame and extending transversely to the conveyer, means for driving said apron, a reel journaled in said frame above the apron, arms on said reel adapted to rotate in proximity to said apron, a ratchet on said reel, a pawl engaging said ratchet, means operated by one of said sprockets for advancing said pawl, and a spring adapted to retract the pawl to actuate said reel.

7. In an apparatus for the purpose specified, the combination with a conveyer comprising a pair of sprocket chains and sprockets supporting said chains, of a series of receptacles extending between said chains and pivotally suspended therefrom, flexible covers for the receptacles, means for depositing a predetermined number of dough portions in each receptacle, means for closing the receptacles, said means comprising a pair of sprockets engaging said chains, bent arms on said sprockets adapted to move into the path of the covers, a rock-shaft arranged above said sprockets, a finger on said shaft adapted to engage a cover when lifted by said arms, means for operating said rock-shaft in one direction synchronously with the conveyer movement, and means for inverting the receptacles when they reach a predetermined point.

8. In an apparatus for the purpose specified, the combination with a frame, an endless conveyer mounted to travel on said frame and composed of sprocket chains and receptacles suspended from said chains, means for depositing portions of dough in each receptacle, said means comprising a frame, an apron mounted on said frame, a reel journaled in said frame above the apron, a ratchet and pawl mechanism for operating said reel, means operated by said conveyer for advancing said pawl, and means adapted to retract the pawl to actuate said reel.

In testimony whereof I affix my signature in the presence of two witnesses.

PHILIP F. CARROLL.

Witnesses:
 H. DE LOS HIGMAN,
 M. A. MILORD.